US012581503B2

(12) United States Patent
Wang et al.

(10) Patent No.: US 12,581,503 B2
(45) Date of Patent: Mar. 17, 2026

(54) METHOD FOR RESOURCE IDENTIFIER DETERMINATION AND RELATED APPARATUSES

(71) Applicant: SPREADTRUM SEMICONDUCTOR (NANJING) CO., LTD., Nanjing (CN)

(72) Inventors: Yuhua Wang, Nanjing (CN); Hualei Wang, Nanjing (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 355 days.

(21) Appl. No.: 18/250,164

(22) PCT Filed: Oct. 20, 2021

(86) PCT No.: PCT/CN2021/125058
§ 371 (c)(1),
(2) Date: Apr. 21, 2023

(87) PCT Pub. No.: WO2022/083652
PCT Pub. Date: Apr. 28, 2022

(65) Prior Publication Data
US 2023/0397227 A1    Dec. 7, 2023

(30) Foreign Application Priority Data
Oct. 21, 2020    (CN) .......................... 202011131182.8

(51) Int. Cl.
*H04L 1/00*        (2006.01)
*H04W 72/232*    (2023.01)
*H04W 72/53*      (2023.01)

(52) U.S. Cl.
CPC ......... *H04W 72/232* (2023.01); *H04W 72/53* (2023.01)

(58) Field of Classification Search
CPC .... H04W 72/232; H04W 72/53; H04W 72/23
See application file for complete search history.

(56) References Cited

U.S. PATENT DOCUMENTS

| | | | |
|---|---|---|---|
| 12,003,988 B2 * | 6/2024 | Cirik ...................... | H04L 5/0053 |
| 2019/0230685 A1 * | 7/2019 | Park ...................... | H04L 1/1854 |

(Continued)

FOREIGN PATENT DOCUMENTS

| | | |
|---|---|---|
| CN | 110536451 A | 12/2019 |
| CN | 111082910 A | 4/2020 |

(Continued)

OTHER PUBLICATIONS

First Office Action issued in corresponding CN application No. 202011131182.8 dated Aug. 30, 2024.

(Continued)

*Primary Examiner* — Abdelnabi O Musa
(74) *Attorney, Agent, or Firm* — Davé Law Group, LLC; Raj S. Davé

(57)        ABSTRACT

A method for resource identifier determination and related apparatuses are provided. The method includes the following. Receive higher-layer configuration information. Determine a first transmission resource of a first transmission point and a second transmission resource of a second transmission point at least according to the higher-layer configuration information. Receive downlink control information (DCI) according to the first transmission resource and the second transmission resource. Determine a physical uplink control channel (PUCCH) resource identifier at least according to the higher-layer configuration information and the DCI.

9 Claims, 2 Drawing Sheets

FIRST TRANSMISSION POINT

SECOND TRANSMISSION POINT

HIGHER-LAYER CONFIGURATION PARAMETER

HIGHER-LAYER CONFIGURATION PARAMETER

CONTROL INFORMATION

CONTROL INFORMATION

TERMINAL DEVICE

(56)     References Cited

U.S. PATENT DOCUMENTS

| 2020/0205149 | A1* | 6/2020 | Khoshnevisan | ..... | H04B 7/0695 |
| 2020/0305168 | A1 | 9/2020 | Liou et al. | | |
| 2020/0314858 | A1 | 10/2020 | Xu et al. | | |
| 2020/0351841 | A1* | 11/2020 | Cirik | .................... | H04B 7/0695 |
| 2021/0006376 | A1* | 1/2021 | Cirik | .................... | H04L 1/1861 |
| 2021/0234640 | A1* | 7/2021 | Cirik | .................... | H04L 1/1854 |
| 2021/0360591 | A1* | 11/2021 | Ji | ........................ | H04L 5/0053 |
| 2022/0078781 | A1* | 3/2022 | Zhou | .................... | H04W 16/14 |
| 2022/0116859 | A1* | 4/2022 | Park | .................... | H04W 72/02 |
| 2022/0116981 | A1* | 4/2022 | Saber | ........................ | H04L 1/08 |
| 2023/0231659 | A1* | 7/2023 | Yang | .................... | H04L 1/1861 |
| 2023/0232481 | A1* | 7/2023 | Park | .................... | H04L 5/0094 |
| | | | | | 370/329 |
| 2023/0337313 | A1* | 10/2023 | Yi | ........................ | H04L 5/0094 |
| 2024/0089064 | A1* | 3/2024 | Cirik | .................... | H04W 72/23 |

FOREIGN PATENT DOCUMENTS

| CN | 111108795 | A | 5/2020 |
| CN | 111431685 | A | 7/2020 |
| CN | 111800863 | A | 10/2020 |
| WO | 2020132280 | A1 | 6/2020 |

OTHER PUBLICATIONS

WIPO, International Search Report and Written Opinion for International Application No. PCT/CN2021/125058, Dec. 29, 2021.

Intel Corporation; On multi-TRP/multi-panel transmission; 3GPP TSG RAN WGi1 Meeting #98b; R1-1910668; Oct. 5, 2019; 15 Pages.

Extended European search report issued for EP application No. 21882067.8 mailed on Jan. 26, 2024, 11 Pages.

* cited by examiner

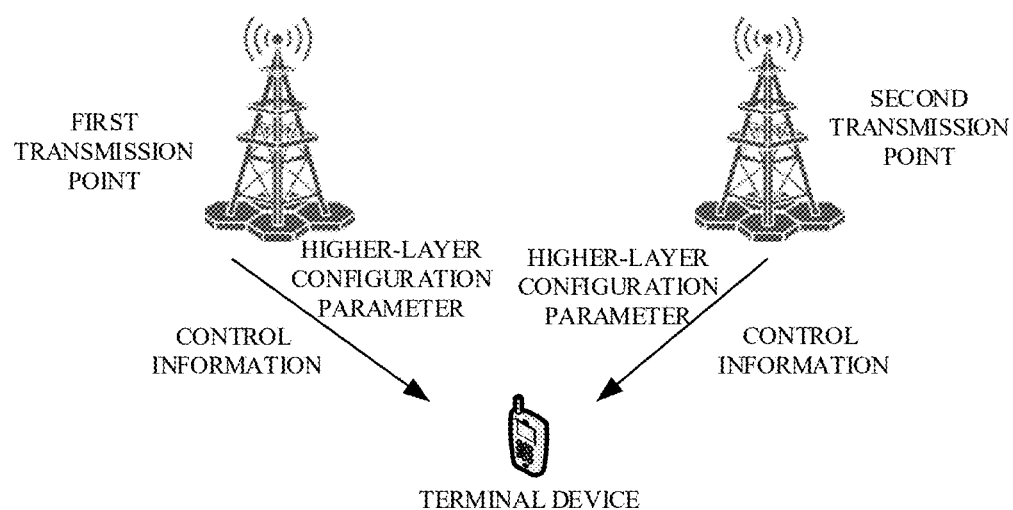

FIRST
TRANSMISSION
POINT

SECOND
TRANSMISSION
POINT

HIGHER-LAYER
CONFIGURATION
PARAMETER

HIGHER-LAYER
CONFIGURATION
PARAMETER

CONTROL
INFORMATION

CONTROL
INFORMATION

TERMINAL DEVICE

FIG. 1

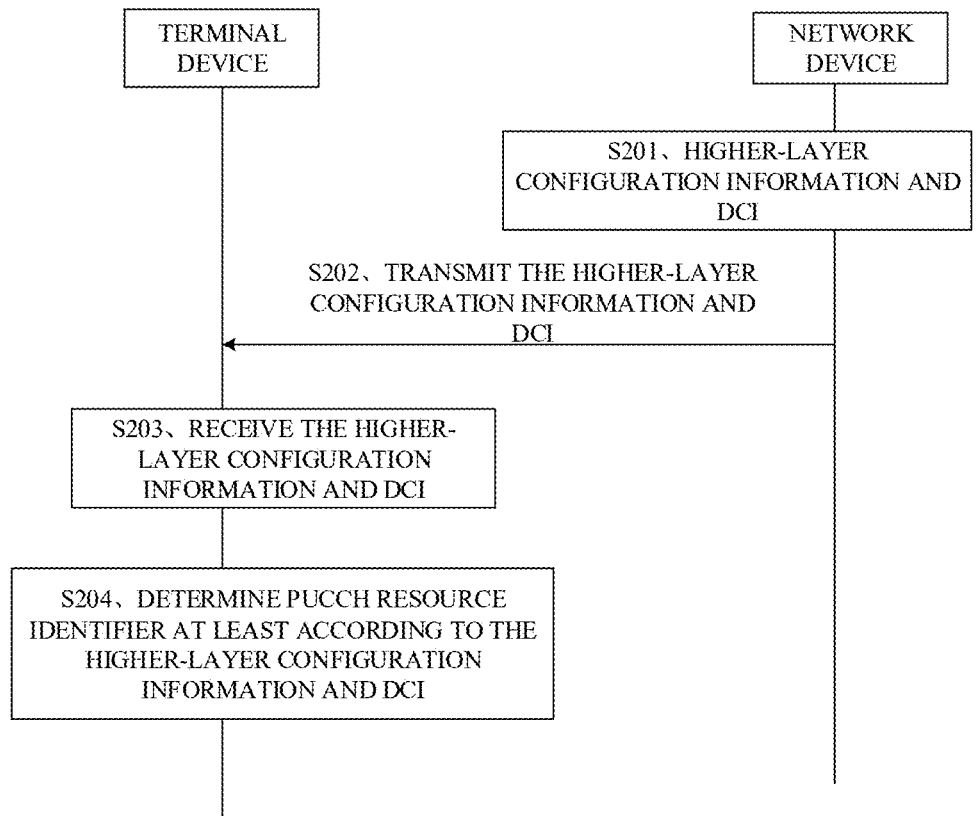

TERMINAL
DEVICE

NETWORK
DEVICE

S201、HIGHER-LAYER
CONFIGURATION INFORMATION AND
DCI

S202、TRANSMIT THE HIGHER-LAYER
CONFIGURATION INFORMATION AND
DCI

S203、RECEIVE THE HIGHER-
LAYER CONFIGURATION
INFORMATION AND DCI

S204、DETERMINE PUCCH RESOURCE
IDENTIFIER AT LEAST ACCORDING TO THE
HIGHER-LAYER CONFIGURATION
INFORMATION AND DCI

FIG. 2

METHOD FOR RESOURCE IDENTIFIER DETERMINATION AND RELATED APPARATUSES

CROSS-REFERENCE TO RELATED APPLICATION(S)

This application is a National Stage of International Application No. PCT/CN2021/125058, field Oct. 20, 2021, which claims priority to Chinese Patent Application No. 202011131182.8, filed Oct. 21, 2020, the entire disclosures of which are hereby incorporated by reference.

TECHNICAL FIELD

This disclosure relates to the field of communication technology, and particularly relates to a method for resource identifier determination and related apparatuses.

BACKGROUND

With the continuous development of communication technology, communication demands are also increasing. More and more communication scenarios require enhancing communication, such as uplink and downlink speeds. In existing solutions for communication enhancement, multiple transmission points are used to send control information to terminal devices in communication-enhanced scenarios, resulting in lower accuracy in determining the physical uplink control channel (PUCCH) resource identifier by terminal equipment.

SUMMARY

In a first aspect, disclosed herein are embodiments of a method for resource identifier determination. The method includes the following. Receive higher-layer configuration information. Determine a first transmission resource of a first transmission point and a second transmission resource of a second transmission point at least according to the higher-layer configuration information. Receive downlink control information (DCI) according to the first transmission resource and the second transmission resource. Determine a PUCCH resource identifier at least according to the higher-layer configuration information and the DCI.

In a second aspect, disclosed herein are embodiments of a terminal device. The terminal device includes a transceiver, a processor, and a memory. The memory storing computer programs which, when executed by the processor, are operable with the processor to: cause the transceiver to receive higher-layer configuration information; determine a first transmission resource of a first transmission point and a second transmission resource of a second transmission point at least according to the higher-layer configuration information; cause the transceiver to receive DCI according to the first transmission resource and the second transmission resource; and determine a PUCCH resource identifier at least according to the higher-layer configuration information and the DCI.

In a third aspect, disclosed herein are embodiments of a non-transitory computer-readable storage medium, where the computer-readable storage medium stores program instructions, and the program instructions causes a computer to perform some or all of the steps described in the first aspect of the embodiments.

These and other aspects of the disclosure will be further clarified in the description of the following embodiments.

BRIEF DESCRIPTION OF THE DRAWINGS

In order to more clearly illustrate the technical solutions in the embodiments of the present disclosure, a brief introduction will be given below on the drawings used in the description of the embodiments. It is obvious that the drawings described below are some embodiments of the present disclosure, and ordinary technicians in the field can obtain other drawings based on these drawings without creative labor.

FIG. 1 is a schematic diagram of a communication system according to an embodiment of the present disclosure.

FIG. 2 is an interactive schematic diagram of a method for resource identifier determination according to an embodiment of the present disclosure.

DETAILED DESCRIPTION

Figure 3:
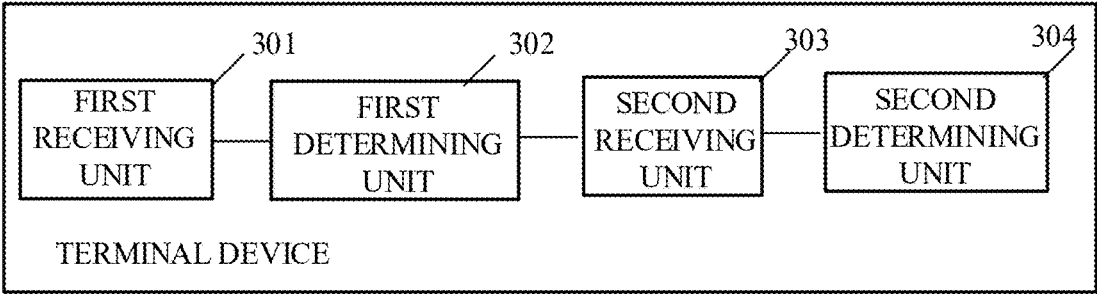
FIG. 3 is a structural schematic diagram of a terminal device according to an embodiment of the present disclosure.

Next, with reference to the drawings in the embodiments of the present disclosure, the technical solutions in the embodiments of the present disclosure will be clearly and completely described. Obviously, the described embodiments are only a part of the embodiments of the present disclosure, not all of them. According to the embodiments disclosed in the present disclosure, all other embodiments obtained by ordinary technicians in the field without creative labor are within the scope of protection of the present disclosure.

The terms "first," "second," etc. used in the specification and claims, as well as in the above drawings, are intended for distinguishing different objects rather than describing a particular sequence. Furthermore, the term "comprising" and it's any variations intend to cover non-exclusively including. For example, a process, method, system, product, or apparatus that includes a series of steps or units is not limited to the listed steps or units but may optionally include unlisted steps or units or optionally include other steps or units inherent in these processes, methods, products, or devices.

The phrase "embodiments" as used herein means one or more embodiments that include specific features, structures, or characteristics as described in conjunction with the embodiments. Use of the phrase throughout the specification does not necessarily refer to the same embodiment, nor are the embodiments mutually exclusive or alternative. Those skilled in the art will appreciate that the embodiments described herein may be combined with other embodiments.

The following abbreviations will be used in the embodiments of the present disclosure. DCI: downlink control information; PUCCH: physical uplink control channel; PDCCH: physical downlink control channel; CCE: control channel element; RRC: radio resource control; MAC: medium access control.

In the embodiments of the present disclosure, the first transmission point and the second transmission point can be network devices, and the network device can be an access network device, such as a base station, gNB, eNB, etc.

In order to better understand the method for resource identifier determination provided in the embodiments of the present disclosure, a brief introduction will be given first on the communication system that applies the method for resource identifier determination. As shown in FIG. 1, the communication system includes a first transmission point, a second transmission point, and a terminal device. The first transmission point determines the corresponding first trans- mission resource according to higher-layer configuration information, and the second transmission point determines the corresponding second transmission resource according to higher-layer configuration information. The first trans- mission point can send downlink control information (DCI) to the terminal device, and the second transmission point can send DCI to the terminal device. The terminal device can determine the physical uplink control channel (PUCCH) resource identifier according to the higher-layer configura- tion information and the DCI.

Disclosed herein are embodiments of a method for resource identifier determination and related apparatus, which can improve the accuracy of determining the physical uplink control channel (PUCCH) resource identifier.

Please refer to FIG. 2. FIG. 2 provides an interactive schematic diagram of a method for resource identifier deter- mination according to an embodiment of the present disclo- sure. As shown in FIG. 2, the method for resource identifier determination includes the following.

S201: A network device determines higher-layer configu- ration information and DCI. The higher-layer configuration information includes configuration information for a control resource set(s) and configuration information for a search space set(s). Additionally, the higher-layer configuration information can include at least one of the following: RRC information, MAC information, or DCI.

DCI includes a first DCI sent by the first transmission point and a second DCI sent by the second transmission point. The first DCI and the second DCI can be the same or different. If the first DCI and the second DCI are different, they can correspond to different parts of the same DCI, or they can correspond to different DCIs.

S202: The network device sends the higher-layer configu- ration information and DCI.

The network device can send the higher-layer configura- tion information through higher-layer signaling, and can send the DCI through PDCCH.

S203: A terminal device receives the higher-layer con- figuration information and the DCI.

S204: The terminal device determines a physical uplink control channel (PUCCH) resource identifier according to at least the higher-layer configuration information and the DCI.

The terminal device can determine the PUCCH resource identifier according to the configuration information for control resource sets and configuration information for search space sets in the higher-layer configuration informa- tion as well as the first DCI and the second DCI in the DCI.

In a possible implementation, a possible method for determining the PUCCH resource identifier at least accord- ing to the higher-layer configuration information and the DCI includes the following.

A1. Determine a first identifier at least according to configuration information for the first transmission resource and the first DCI, determine a second identifier at least according to configuration information for the second trans- mission resource and the second DCI.

A2. Determine the first identifier or the second identifier as the PUCCH resource identifier according to a predefined method.

A3. Determine the maximum (or referred to as "maxi- mum value") of the first identifier and the second identifier as the PUCCH resource identifier.

A4. Determine the minimum (or referred to as "minimum value") of the first identifier and the second identifier as the PUCCH resource identifier.

A method for determining the first identifier at least according to configuration information for the first trans- mission resource and the first DCI can be as follows. Methods available in the related art can be used to determine the first identifier and the second identifier, for example, R17 multi-TRP related standards.

In a possible implementation, a possible method for determining the first identifier or the second identifier as the PUCCH resource identifier according to a predefined method includes the following.

A21. Determine the maximum of the first identifier and the second identifier as the PUCCH resource identifier according to indication information.

A22. Alternatively, determine the minimum of the first identifier and the second identifier as the PUCCH resource identifier according to indication information.

The indication information may be indication information sent to the terminal device by the network device. The indication information may include RRC information, MAC information, and DCI.

Determining the maximum of the first identifier and the second identifier as the PUCCH resource identifier can be comprehend as follows: determine the maximum of the first identifier and the second identifier as the PUCCH resource identifier according to the indication of indication informa- tion. For example, the indication information can indicate directly that the maximum or the minimum of the first identifier and the second identifier is determined as the PUCCH resource identifier.

In a possible implementation, another method for deter- mining the PUCCH resource identifier at least according to the higher-layer configuration information and the DCI includes the following.

B1. Determine the time-domain start position for receiv- ing the first DCI, at least according to the configuration information for the first transmission resource, and deter- mine the time-domain start position for receiving the second DCI, at least according to the configuration information for the second transmission resource.

B2. Determine the PUCCH resource identifier at least according to the time-domain start position for receiving the first DCI and the time-domain start position for receiving the second DCI according to a predefined method.

The PUCCH resource identifier can be determined according to the order of the time-domain start position for receiving the first DCI and the time-domain start position for receiving the second DCI.

In a possible implementation, a possible method for determining the PUCCH resource identifier at least accord- ing to the time-domain start position for receiving the first DCI and the time-domain start position for receiving the second DCI according to the predefined method includes the following.

B21. If the time-domain start position for receiving the first DCI is before the time-domain start position for receiv- ing the second DCI, determine the PUCCH resource iden- tifier at least according to the first transmission resource and the first DCI.

B22. Alternatively, if the time-domain start position for receiving the first DCI is before the time-domain start position for receiving the second DCI, determine the PUCCH resource identifier at least according to the second transmission resource and the second DCI.

B23. Alternatively, determine to obtain the PUCCH resource identifier at least according to the first transmission resource and the first DCI, according to the indication of indication information.

B24. Alternatively, determine to obtain the PUCCH resource identifier at least according to the second transmission resource and the second DCI, according to the indication of indication information.

The indication information can indicate to obtain the PUCCH resource identifier according to the first transmission resource and the first DCI, or, obtain the PUCCH resource identifier at least according to the second transmission resource and the second DCI. Indication provided by the indication information can also be accomplished in other manners.

In a possible implementation, a possible method for determining the PUCCH resource identifier at least according to the higher-layer configuration information and the DCI includes the following.

C1. Determine an index of a first PDCCH and a starting-CCE index of the first PDCCH at least according to configuration information for the first transmission resource and the first DCI, and determine an index of a second PDCCH and a starting-CCE index of the second PDCCH at least according to configuration information for the second transmission resource and the second DCI.

C2. Determine the PUCCH resource identifier at least according to the starting-CCE index of the first PDCCH or the starting-CCE index of the second PDCCH according to a predefined method.

C3. Alternatively, determine the PUCCH resource identifier at least according to a starting-CCE index of a PDCCH corresponding to the maximum of the index of the first PDCCH and the index of the second PDCCH.

C4. Alternatively, determine the PUCCH resource identifier at least according to a starting-CCE index of a PDCCH corresponding to the minimum of the index of the first PDCCH and the index of the second PDCCH.

The PUCCH resource identifier can be determined according to the PDCCH resources as follows. The PUCCH resource identifier can be determined according to the index of the staring CCE in the PDCCH resource. The PUCCH resource identifier can also be determined in other manners, where the first PDCCH carries first DCI and the second PDCCH carries second DCI.

In a possible implementation, a possible method for determining the PUCCH resource identifier at least according to the starting-CCE index of the first PDCCH or the starting-CCE index of the second PDCCH according to a predefined method includes the following.

C21. According to indication information, determine to obtain the PUCCH resource identifier at least according to a starting-CCE index of a PDCCH corresponding to the maximum of an index of the first PDCCH resource and an index of the second PDCCH.

C22. Alternatively, according to indication information, determine to obtain the PUCCH resource identifier at least according to a starting-CCE index of a PDCCH corresponding to the minimum of an index of the first PDCCH resource and an index of the second PDCCH.

Obtaining the PUCCH resource identifier according to the PDCCH resource corresponding to the maximum or the minimum can be indicated through the indication information, or through other manners.

In a possible implementation, another method for determining the PUCCH resource identifier at least according to the higher-layer configuration information and the DCI includes the following.

D1. Determine a starting-CCE index for receiving the first PDCCH at least according to configuration information for the first transmission resource and the first DCI, and determine a starting-CCE index for receiving the second PDCCH at least according to configuration information for the second transmission resource and the second DCI.

D2. Determine the PUCCH resource identifier at least according to the starting-CCE index of the first PDCCH or the starting-CCE index of the second PDCCH according to a predefined method.

D3. Alternatively, determine the PUCCH resource identifier at least according to the maximum of the starting-CCE index for receiving the first PDCCH and the starting-CCE index for receiving the second PDCCH.

D4. Alternatively, determine the PUCCH resource identifier at least according to the minimum of the starting-CCE index for receiving the first PDCCH and the starting-CCE index for receiving the second PDCCH.

The CCE index can be determined as the PUCCH resource identifier, or the PUCCH resource identifier can be determined according to a value obtained by transforming the CCE index.

A possible method for determining the PUCCH resource identifier according to the starting-CCE index for receiving the first PDCCH and the starting-CCE index for receiving the second PDCCH according to the predefined method includes the following.

D21. Determine, at least according to indication information, to obtain the PUCCH resource identifier according to the maximum of the starting-CCE index of the first PDCCH and the starting-CCE index of the second PDCCH.

D22. Alternatively, determine, at least according to indication information, to obtain the PUCCH resource identifier according to the minimum of the starting-CCE index of the first PDCCH and the starting-CCE index of the second PDCCH.

Obtaining the PUCCH resource identifier according to a starting-CCE index of a PDCCH corresponding to the maximum index or the minimum index is indicated through the indication information, or can be indicated through other manners.

In another possible implementation, another method for determining the PUCCH resource identifier at least according to the higher-layer configuration information and the DCI includes the following.

E1: Determine the identifier of the first TCI state and the identifier of the second TCI state according to the higher-layer configuration information. The position of the first TCI state in the control resource set is before the position of the second TCI state, and the first TCI state is used for the first transmission point to transmit the PDCCH, and the second TCI state is used for the second transmission point to transmit the PDCCH.

E2: Determine, in a predefined manner, to determine the PUCCH resource identifier at least according to the transmission resource corresponding to the first TCI state or the second TCI state and the DCI.

E3: Alternatively, determine, in a predefined manner, to determine the PUCCH resource identifier at least according to the transmission resource corresponding to the maximum TCI state identifier or the minimum TCI state identifier of the first TCI state identifier or the second TCI state identifier and the DCI.

A method for determining the PUCCH resource identifier according to the transmission resource corresponding to the TCI state identifier and the DCI may include the following: the PUCCH resource identifier can be determined according to the index of the starting CCE in the transmission resource and the DCI.

One possible method of determining, in a predefined manner, to determine the PUCCH resource identifier according to the transmission resource corresponding to the first TCI state or the second TCI state and the DCI includes the following. Determine, according to indication information, to determine the PUCCH resource identifier at least according to the transmission resource corresponding to the first TCI state or the second TCI state and the DCI.

One possible method for determining, according to a predefined manner, to determine the PUCCH resource identifier according to the transmission resource corresponding to the maximum TCI state identifier or the minimum TCI state identifier of the first TCI state identifier or the second TCI state identifier and the DCI includes the following. Determine, according to indication information, to determine the PUCCH resource identifier according to the transmission resource corresponding to the maximum TCI state identifier or the minimum TCI state identifier of the first TCI state identifier or the second TCI state identifier and the DCI.

The higher-layer configuration information may carry indication information, where the indication information indicates the specific method for determining the PUCCH resource identifier.

In a possible implementation, if the higher-layer configuration information contains an index of a first search space set and an index of a second search space set, with the first search space set corresponds to the first transmission point and the second search space set corresponds to the second transmission point, another possible method for determining the PUCCH resource identifier at least according to the higher-layer configuration information and the DCI includes the following.

F1. Determine the PUCCH resource identifier at least according to resources corresponding to the first search space set or the second search space set according to a predefined method.

F2. Alternatively, determine the PUCCH resource identifier at least according to resources corresponding to a search space set with a smallest or largest index in the first search space set and the second search space set.

A possible method for determining the PUCCH resource identifier at least according to resources corresponding to the first search space set or the second search space set according to a predefined method may include the following.

F11. Determine, according to indication information, to determine the PUCCH resource identifier at least according to transmission resources corresponding to the first search space set or the second search space set and DCI.

F12. Alternatively, determine, according to indication information, to determine the PUCCH resource identifier at least according to resources corresponding to a search space set with a smallest or largest index in the first search space set index and the second search space set index.

The indication information can directly indicate that the PUCCH resource identifier is to be determined at least according to the transmission resource corresponding to the first search space set or the second search space set and the DCI, or the indication information can directly indicate that the PUCCH resource identifier is to be determined at least according to resources corresponding to a search space set with a smallest or largest index in the first search space set index and the second search space set index.

In a possible implementation, if the higher-layer configuration information contains an index of a first control resource set/an index of a first control resource set pool and an index of a second control resource set/an index of a first control resource set pool, where the first control resource set corresponds to the first transmission point and the second control resource set corresponds to the second transmission point, a possible method for determining the PUCCH resource identifier at least according to the higher-layer configuration information and the DCI includes the following.

G1. Determine the PUCCH resource identifier according to resources associated with the control resource set corresponding to the minimum or maximum of the index of the first control resource set and the index of the second control resource set, according to a predefined method.

G2. Alternatively, determine the PUCCH resource identifier according to resources associated with the control resource set corresponding to the minimum or maximum of the index of the first control resource set pool and the index of the second control resource set pool, according to a predefined method.

For example, the index of the first control resource set is 1 and the index of the second control resource set is 2, then the PUCCH resource identifier can be determined according to the first control resource set, for example, [n_cce2=16, N_cce2=32]. Where the number of CCEs in the first control resource set is $N\_cce2=32$, and $n\_cce2=16$ is the index of the starting CCE in the first transmission resource.

If the CORESET is not configured with a CORESET pool index, the CORESET pool index will be 0 by default.

A possible method for determining the PUCCH resource identifier at least according to resources associated with the control resource set corresponding to the minimum or maximum of the index of the first control resource set and the index of the second control resource set includes the following. Determine, according to indication information, to determine the PUCCH resource identifier at least according to resources associated with the control resource set corresponding to the minimum or maximum of the index of the first control resource set and the index of the second control resource set.

A possible method for determining the PUCCH resource identifier according to resources associated with the control resource set corresponding to the minimum or maximum of the index of the first control resource set pool and the index of the second control resource set pool according to a predefined method includes the following. Determine, according to indication information, to determine the PUCCH resource identifier at least according to resources associated with the control resource set corresponding to the minimum or maximum of the index of the first control resource set pool and the index of the second control resource set pool.

In a possible implementation, if the higher-layer configuration information contains a first control resource set and a second control resource set, and the first control resource set corresponds to the first transmission point and the second control resource set corresponds to the second transmission point, a possible method for determining the PUCCH resource identifier at least according to the higher-layer configuration information and the DCI includes the following.

H1. Determine a first CCE number according to the first control resource set, and determine a second CCE number according to the second control resource set.

H2. Determine the PUCCH resource identifier at least according to the minimum or maximum of the first CCE number and the second CCE number according to a predefined method.

H3. Alternatively, determine the PUCCH resource identifier at least according to the minimum of the first CCE number and the second CCE number.

H4. Alternatively, determine the PUCCH resource identifier at least according to the maximum of the first CCE number and the second CCE number.

In a possible example, the PUCCH resource identifier is determined according to the maximum of the first CCE number and the second CCE number as follows.

The first CCE number of the first control resource set is 32 and the second CCE number of the second control resource set is 64, the index of the starting CCE in the first transmission resource is 8 and the index of the starting CCE in the second transmission resource is 16, then the PUCCH resource index can be [n_cce2=16, N_cce2=64], where n_cce2=16 is the index of the starting CCE in the second transmission resource, and N_cce2=64 is the second CCE number of the second control resource set.

One possible method for determining the PUCCH resource identifier at least according to the minimum or maximum of the first CCE number and the second CCE number according to a predefined method includes the following.

Determine, according to indication information, to determine the PUCCH resource identifier at least according to the minimum or maximum of the first CCE number and the second CCE number according to indication information.

The method of determining the PUCCH resource identifier through indication information in the above-mentioned embodiment can be understood as determining the PUCCH resource identifier in a specific method which is indicated by the indication information and is for determining the PUCCH resource identifier.

The method of determining the PUCCH resource identifier can be applied to a terminal device or a network device.

In one possible implementation, another method for PUCCH resource identifier determination includes the following.

A network device transmits resource identifier indication information, where the resource identifier indication information is indicative of a PUCCH resource identifier; a terminal device receives the resource identifier indication information and determines PUCCH resource identifier according to the resource identifier indication information.

The resource identifier indication information may contain the PUCCH resource identifier. In this case, the PUCCH resource identifier can obtained from the resource identifier indication information. The resource identifier indication information may also indicate the PUCCH resource identifier implicitly.

Consistent with the above, please refer to FIG. 3 which provides a schematic diagram of the structure of a terminal device according to an embodiment. As shown in FIG. 3, the terminal device includes the following.

A first receiving unit 301 configured to receive higher-layer configuration information; a first determining unit 302 configured to determine a first transmission resource of a first transmission point and a second transmission resource of a second transmission point at least according to the higher-layer configuration information; a second receiving unit 303 configured to receive DCI according to the first transmission resource and the second transmission resource; and a second determining unit 304 configured to determine a PUCCH resource identifier at least according to the higher-layer configuration information and the DCI.

Figure 5:
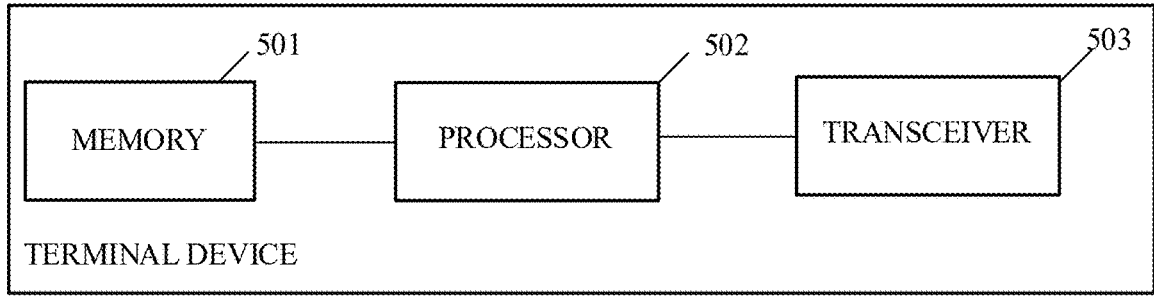
FIG. 5 is a structural schematic diagram of a terminal device according to an embodiment of the present disclosure.

The first receiving unit 301 and the second receiving unit 303 can be integrated into or implemented as a transceiver 503, the first determining unit 302 and the second determining unit 304 can be integrated into or implemented as a processor 502. The processor 502 may invoke programs stored in a memory 501 to cause the transceiver 503 to conduct transmission and/or reception. The memory 501, the processor 502, and the transceiver 503 are illustrated in FIG. 5.

In a possible implementation, the higher-layer configuration information includes configuration information for a control resource set and configuration information for a search space set, the DCI includes a first DCI sent by a first transmission point and a second DCI sent by a second transmission point.

In a possible implementation, the second determining unit 304 is configured to: determine a first identifier at least according to configuration information for the first transmission resource and the first DCI, determine a second identifier at least according to configuration information for the second transmission resource and the second DCI; determine the first identifier or the second identifier as the PUCCH resource identifier according to a predefined method; or, determine the maximum of the first identifier and the second identifier as the PUCCH resource identifier; or, determine the minimum of the first identifier and the second identifier as the PUCCH resource identifier.

In a possible implementation, in terms of determining the first identifier or the second identifier as the PUCCH resource identifier according to a predefined method, the second determining unit 304 is configured to: determine the maximum of the first identifier or the second identifier as the PUCCH resource identifier according to indication information, or determine the minimum of the first identifier or the second identifier as the PUCCH resource identifier according to indication information. The indication information includes at least one of: RRC information, MAC information, and DCI.

In a possible implementation, the second determining unit 304 is configured to: determine the time-domain start position for receiving the first DCI, at least according to the configuration information for the first transmission resource, and determine the time-domain start position for receiving the second DCI, at least according to the configuration information for the second transmission resource; determine the PUCCH resource identifier at least according to the time-domain start position for receiving the first DCI and the time-domain start position for receiving the second DCI according to a predefined method.

In a possible implementation, in terms of determining the PUCCH resource identifier at least according to the time-domain start position for receiving the first DCI and the time-domain start position for receiving the second DCI according to the predefined method, the second determining unit 304 is configured to: if the time-domain start position for receiving the first DCI is before the time-domain start position for receiving the second DCI, determine the PUCCH resource identifier at least according to the first transmission resource and the first DCI; or, if the time-domain start position for receiving the first DCI is before the time-domain start position for receiving the second DCI, determine the PUCCH resource identifier at least according to the second transmission resource and the second DCI; or, determine to obtain the PUCCH resource identifier at least according to the first transmission resource and the first DCI, according to the indication information; or, determine to obtain the PUCCH resource identifier at least according to the second transmission resource and the second DCI, according to the indication information. The indication information includes at least one of: RRC information, MAC information, DCI.

In a possible implementation, the second determining unit 304 is configured to: determine an index of a first PDCCH and a starting-CCE index of the first PDCCH at least according to configuration information for the first transmission resource and the first DCI, and determine an index of a second PDCCH and a starting-CCE index of the second PDCCH at least according to configuration information for the second transmission resource and the second DCI; determine the PUCCH resource identifier at least according to the starting-CCE index of the first PDCCH or the starting-CCE index of the second PDCCH according to a predefined method; or, determine the PUCCH resource identifier at least according to a starting-CCE index of a PDCCH corresponding to the maximum of the index of the first PDCCH and the index of the second PDCCH; or, determine the PUCCH resource identifier at least according to a starting-CCE index of a PDCCH corresponding to the minimum of the index of the first PDCCH and the index of the second PDCCH.

In a possible implementation, in terms of determining the PUCCH resource identifier according to a starting-CCE index of a PDCCH corresponding to the index of the first PDCCH or the index of the second PDCCH according to a predefined method, the second determining unit 304 is configured to: according to indication information, determine to obtain the PUCCH resource identifier at least according to a starting-CCE index of a PDCCH corresponding to the maximum of an index of the first PDCCH resource and an index of the second PDCCH; or, according to indication information, determine to obtain the PUCCH resource identifier at least according to a starting-CCE index of a PDCCH corresponding to the minimum of an index of the first PDCCH resource and an index of the second PDCCH. The indication information includes at least one of: RRC information, MAC information, DCI.

In a possible implementation, the second determining unit 304 is configured to: determine a starting-CCE index for receiving the first PDCCH at least according to configuration information for the first transmission resource and the first DCI, and determine a starting-CCE index for receiving the second PDCCH at least according to configuration information for the second transmission resource and the second DCI; determine the PUCCH resource identifier at least according to the starting-CCE index of the first PDCCH or the starting-CCE index of the second PDCCH according to a predefined method; or, determine the PUCCH resource identifier at least according to the maximum of the starting-CCE index for receiving the first PDCCH and the starting-CCE index for receiving the second PDCCH; or, determine the PUCCH resource identifier at least according to the minimum of the starting-CCE index for receiving the first PDCCH and the starting-CCE index for receiving the second PDCCH.

In a possible implementation, in terms of determining the PUCCH resource identifier at least according to the higher-layer configuration information and the DCI, the second determining unit 304 is configured to: determine, at least according to indication information, to obtain the PUCCH resource identifier according to the maximum of the starting-CCE index of the first PDCCH and the starting-CCE index of the second PDCCH; or, determine, at least according to indication information, to obtain the PUCCH resource identifier according to the minimum of the starting-CCE index of the first PDCCH and the starting-CCE index of the second PDCCH. The indication information includes at least one of: RRC information, MAC information, DCI.

In a possible implementation, the second determining unit 304 is configured to: determine the identifier of the first TCI state and the identifier of the second TCI state according to the higher-layer configuration information, the position of the first TCI state in the control resource set is before the position of the second TCI state, the first TCI state is used for the first transmission point to transmit the PDCCH, and the second TCI state is used for the second transmission point to transmit the PDCCH; determine, in a predefined manner, to determine the PUCCH resource identifier at least according to the transmission resource corresponding to the first TCI state or the second TCI state and the DCI; or, determine, in a predefined manner, to determine the PUCCH resource identifier at least according to the transmission resource corresponding to the maximum TCI state identifier or the minimum TCI state identifier of the first TCI state identifier or the second TCI state identifier and the DCI.

In a possible implementation, in terms of determining, in a predefined manner, to determine the PUCCH resource identifier according to the transmission resource corresponding to the first TCI state or the second TCI state and the DCI, the second determining unit 304 is configured to: determine, according to indication information, to determine the PUCCH resource identifier at least according to the transmission resource corresponding to the first TCI state or the second TCI state and the DCI.

Determining, according to a predefined manner, to determine the PUCCH resource identifier according to the transmission resource corresponding to the maximum TCI state identifier or the minimum TCI state identifier of the first TCI state identifier or the second TCI state identifier and the DCI includes the following. Determine, according to indication information, to determine the PUCCH resource identifier according to the transmission resource corresponding to the maximum TCI state identifier or the minimum TCI state identifier of the first TCI state identifier or the second TCI state identifier and the DCI. The indication information includes at least one of: RRC information, MAC information, DCI.

In a possible implementation, if the higher-layer configuration information contains an index of a first search space set and an index of a second search space set, with the first search space set corresponds to the first transmission point and the second search space set corresponds to the second transmission point, the second determining unit 304 is configured to: determine the PUCCH resource identifier at least according to resources corresponding to the first search space set or the second search space set according to a predefined method; or, determine the PUCCH resource identifier at least according to resources corresponding to a search space set with a smallest or largest index in the first search space set and the second search space set.

In a possible implementation, in terms of determining the PUCCH resource identifier at least according to resources corresponding to the first search space set or the second search space set according to a predefined method, the second determining unit 304 is configured to: determine, according to indication information, to determine the PUCCH resource identifier at least according to transmission resources corresponding to the first search space set or the second search space set and DCI; or, determine, according to indication information, to determine the PUCCH resource identifier at least according to resources corresponding to a search space set with a smallest or largest index in the first search space set index and the second search space set index. The indication information includes at least one of: RRC information, MAC information, DCI.

In a possible implementation, if the higher-layer configuration information contains an index of a first control resource set/an index of a first control resource set pool and an index of a second control resource set/an index of a first control resource set pool, where the first control resource set corresponds to the first transmission point and the second control resource set corresponds to the second transmission point, the second determining unit 304 is configured to: determine the PUCCH resource identifier at least according to resources associated with the control resource set corresponding to the minimum or maximum of the index of the first control resource set and the index of the second control resource set, according to a predefined method; or, determine the PUCCH resource identifier at least according to resources associated with the control resource set corresponding to the minimum or maximum of the index of the first control resource set pool and the index of the second control resource set pool, according to a predefined method.

In a possible implementation, in terms of determining, according to a predefined method, the PUCCH resource identifier at least according to resources associated with the control resource set corresponding to the minimum or maximum of the index of the first control resource set and the index of the second control resource set, the second determining unit 304 is configured to: determine, according to indication information, to determine the PUCCH resource identifier at least according to resources associated with the control resource set corresponding to the minimum or maximum of the index of the first control resource set and the index of the second control resource set.

Determining the PUCCH resource identifier according to resources associated with the control resource set corresponding to the minimum or maximum of the index of the first control resource set pool and the index of the second control resource set pool according to a predefined method includes the following. Determine, according to indication information, to determine the PUCCH resource identifier at least according to resources associated with the control resource set corresponding to the minimum or maximum of the index of the first control resource set pool and the index of the second control resource set pool. The indication information includes at least one of: RRC information, MAC information, DCI.

In a possible implementation, if the higher-layer configuration information contains a first control resource set and a second control resource set, and the first control resource set corresponds to the first transmission point and the second control resource set corresponds to the second transmission point, the second determining unit 304 is configured to: determine a first CCE number according to the first control resource set, and determine a second CCE number according to the second control resource set; determine a first CCE number according to the first control resource set, and determine a second CCE number according to the second control resource set; or, determine the PUCCH resource identifier at least according to the minimum of the first CCE number and the second CCE number; or, determine the PUCCH resource identifier at least according to the maximum of the first CCE number and the second CCE number.

In a possible implementation, in terms of determining the PUCCH resource identifier at least according to the minimum or maximum of the first CCE number and the second CCE number according to a predefined method, the second determining unit 304 is configured to: determine, according to indication information, to determine the PUCCH resource identifier at least according to the minimum or maximum of the first CCE number and the second CCE number. The indication information includes at least one of: RRC information, MAC information, DCI.

In a possible implementation, the terminal device is further configured to: receive resource identifier indication information, and determine the PUCCH resource identifier according to the resource identifier indication information.

Figure 4:
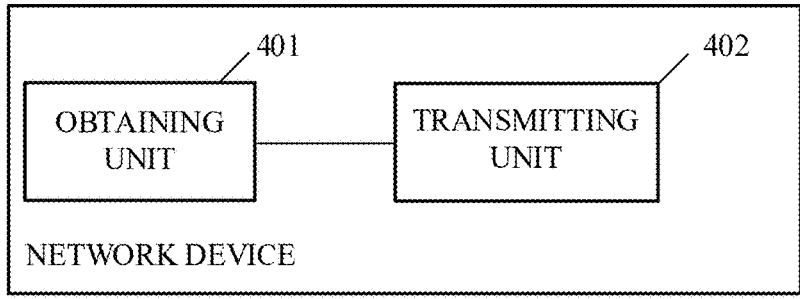
FIG. 4 is a structural schematic diagram of a network device according to an embodiment of the present disclosure.

Please refer to FIG. 4, which provides a schematic diagram of the structure of a network device according to an embodiment. As shown in FIG. 4, the device includes the following.

An obtaining unit 401 configured to obtain higher-layer configuration information and DCI, where the DCI comprises control information sent by a first transmission point over a first transmission resource and control information sent by a second transmission point over a second transmission resource; a sending unit 402 configured to send the higher-layer configuration information and the DCI.

In a possible implementation, the device is further configured to: determine a PUCCH resource identifier at least according to the higher-layer configuration information and the DCI.

In a possible implementation, the higher-layer configuration information includes configuration information for a control resource set and configuration information for a search space set, the DCI includes a first DCI sent by a first transmission point and a second DCI sent by a second transmission point.

In a possible implementation, the device is further configured to: determine a first identifier at least according to configuration information for the first transmission resource and the first DCI, determine a second identifier at least according to configuration information for the second transmission resource and the second DCI; determine the first identifier or the second identifier as the PUCCH resource identifier according to a predefined method; or, determine the maximum of the first identifier and the second identifier as the PUCCH resource identifier; or determine the minimum of the first identifier and the second identifier as the PUCCH resource identifier.

In a possible implementation, the device is further configured to: determine the time-domain start position for receiving the first DCI, at least according to the configuration information for the first transmission resource, and determine the time-domain start position for receiving the second DCI, at least according to the configuration information for the second transmission resource; determine the PUCCH resource identifier at least according to the time-domain start position for receiving the first DCI and the time-domain start position for receiving the second DCI according to a predefined method.

In a possible implementation, the device is further configured to: determine an index of a first PDCCH and a starting-CCE index of the first PDCCH at least according to configuration information for the first transmission resource and the first DCI, and determine an index of a second PDCCH and a starting-CCE index of the second PDCCH at least according to configuration information for the second transmission resource and the second DCI; determine the PUCCH resource identifier at least according to the starting- CCE index of the first PDCCH or the starting-CCE index of the second PDCCH according to a predefined method; or, determine the PUCCH resource identifier at least according to a starting-CCE index of a PDCCH corresponding to the maximum of the index of the first PDCCH and the index of the second PDCCH; or, determine the PUCCH resource identifier at least according to a starting-CCE index of a PDCCH corresponding to the minimum of the index of the first PDCCH and the index of the second PDCCH.

In a possible implementation, the device is further configured to: determine a starting-CCE index for receiving the first PDCCH at least according to configuration information for the first transmission resource and the first DCI, and determine a starting-CCE index for receiving the second PDCCH at least according to configuration information for the second transmission resource and the second DCI; determine the PUCCH resource identifier at least according to the starting-CCE index of the first PDCCH or the starting-CCE index of the second PDCCH according to a predefined method; or, determine the PUCCH resource identifier at least according to the maximum of the starting-CCE index for receiving the first PDCCH and the starting-CCE index for receiving the second PDCCH; or, determine the PUCCH resource identifier at least according to the minimum of the starting-CCE index for receiving the first PDCCH and the starting-CCE index for receiving the second PDCCH.

In a possible implementation, the device is further configured to: determine the identifier of the first TCI state and the identifier of the second TCI state according to the higher-layer configuration information, the position of the first TCI state in the control resource set is before the position of the second TCI state, the first TCI state is used for the first transmission point to transmit the PDCCH, and the second TCI state is used for the second transmission point to transmit the PDCCH; determine, in a predefined manner, to determine the PUCCH resource identifier at least according to the transmission resource corresponding to the first TCI state or the second TCI state and the DCI; or, determine, in a predefined manner, to determine the PUCCH resource identifier at least according to the transmission resource corresponding to the maximum TCI state identifier or the minimum TCI state identifier of the first TCI state identifier or the second TCI state identifier and the DCI.

In a possible implementation, if the higher-layer configuration information contains an index of a first search space set and an index of a second search space set, with the first search space set corresponds to the first transmission point and the second search space set corresponds to the second transmission point, the device is configured to: determine the PUCCH resource identifier at least according to resources corresponding to the first search space set or the second search space set according to a predefined method; or, determine the PUCCH resource identifier at least according to resources corresponding to a search space set with a smallest or largest index in the first search space set and the second search space set.

In a possible implementation, if the higher-layer configuration information contains an index of a first control resource set/an index of a first control resource set pool and an index of a second control resource set/an index of a first control resource set pool, where the first control resource set corresponds to the first transmission point and the second control resource set corresponds to the second transmission point, the device is further configured to: determine the PUCCH resource identifier at least according to resources associated with the control resource set corresponding to the minimum or maximum of the index of the first control resource set and the index of the second control resource set, according to a predefined method; or, determine the PUCCH resource identifier at least according to resources associated with the control resource set corresponding to the minimum or maximum of the index of the first control resource set pool and the index of the second control resource set pool, according to a predefined method.

In a possible implementation, if the higher-layer configuration information contains a first control resource set and a second control resource set, and the first control resource set corresponds to the first transmission point and the second control resource set corresponds to the second transmission point, the device is configured to: determine a first CCE number according to the first control resource set, and determine a second CCE number according to the second control resource set; determine a first CCE number according to the first control resource set, and determine a second CCE number according to the second control resource set; or, determine the PUCCH resource identifier at least according to the minimum of the first CCE number and the second CCE number; or, determine the PUCCH resource identifier at least according to the maximum of the first CCE number and the second CCE number.

In a possible implementation, the device is further configured to transmit resource identifier indication information, which is indicative of the PUCCH resource identifier.

Embodiments of the present disclosure further provide a communication apparatus. The communication apparatus includes a processing module, a storage module, and a communication module. The storage module is used for storing a computer program. The processing module is configured to run the computer program, and execute, in combination with the communication module, some or all of the steps of any method for resource identifier determination described in the foregoing method embodiments.

Embodiments of the present disclosure further provide a computer storage medium. The computer storage medium stores a computer program for exchanging electronic data. The computer program enables a computer to execute some or all of the steps of any method for resource identifier determination described in the foregoing method embodiments.

Embodiments of the present disclosure further provide a computer program product. The computer program product includes a non-transitory computer-readable storage medium storing a computer program. The computer program enables a computer to execute some or all steps of any method for resource identifier determination described in the foregoing method embodiments.

It should be noted that, for brevity of description, the foregoing method embodiments are described as a series of actions. However, persons skilled in the art should understand that the present disclosure is not limited to the described order of actions, because according to the present disclosure, some steps may be performed in another order or simultaneously. Secondly, those skilled in the art should also know that the embodiments described in the description are all preferred embodiments, and the involved actions and modules are not necessarily required in the present disclosure.

In the foregoing embodiments, the description of each embodiment has its emphasis, and for a part that is not described in detail in a certain embodiment, reference may be made to the relevant description of other embodiments.

In the several embodiments provided in the present disclosure, it should be understood that the disclosed apparatus may be implemented in other manners. For example, the apparatus embodiments described above are merely exemplary, for example, the division of the units is merely logical function division, and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts illustrated as units may or may not be physical units, may be located in one position, or may be distributed on a plurality of network elements. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, and may also be implemented in a form of a software program module.

If the integrated unit is implemented in a form of a software program module and sold or used as an independent product, the integrated unit may be stored in a computer readable memory. Based on such an understanding, the technical solutions of the present disclosure essentially, or the part contributing to the prior art, or all or a part of the technical solutions may be implemented in the form of a software product, The computer software product is stored in a memory, and includes several instructions for instructing a computer device (which may be a personal computer, a server, a network device, or the like) to perform all or a part of the steps of the methods described in the embodiments of the present disclosure. The foregoing memory includes: any medium that can store program codes, such as a USB flash disk, a read-only memory (ROM), a random access memory (RAM), a mobile hard disk, a magnetic disk, or an optical disk.

In a first aspect, disclosed herein are embodiments of a method for resource identifier determination. The method includes the following. Receive higher-layer configuration information. Determine a first transmission resource of a first transmission point and a second transmission resource of a second transmission point at least according to the higher-layer configuration information. Receive downlink control information (DCI) according to the first transmission resource and the second transmission resource. Determine a PUCCH resource identifier at least according to the higher-layer configuration information and the DCI.

The terminal device receives higher-layer configuration information, determines a first transmission resource of a first transmission point and a second transmission resource of a second transmission point at least according to the higher-layer configuration information, receives DCI according to the first transmission resource and the second transmission resource and determines a PUCCH resource identifier at least according to the higher-layer configuration information and the DCI. As such, the PUCCH resource identifier can be determined according to the higher-layer configuration information and the DCI, which can improve the accuracy of determining the PUCCH resource identifier.

Building on the first aspect, in a possible implementation, the higher-layer configuration information includes configuration information for a control resource set and configuration information for a search space set, the DCI includes a first DCI sent by a first transmission point and a second DCI sent by a second transmission point.

Building on the first aspect, in a possible implementation, determining the PUCCH resource identifier at least according to the higher-layer configuration information and the DCI includes the following. Determine a first identifier at least according to configuration information for the first transmission resource and the first DCI, determine a second identifier at least according to configuration information for the second transmission resource and the second DCI. Determine the first identifier or the second identifier as the PUCCH resource identifier according to a predefined method. Or, determine the maximum of the first identifier and the second identifier as the PUCCH resource identifier. Or, determine the minimum of the first identifier and the second identifier as the PUCCH resource identifier.

Building on the first aspect, in a possible implementation, determining the first identifier or the second identifier as the PUCCH resource identifier according to a predefined method includes the following. Determine the maximum of the first identifier and the second identifier as the PUCCH resource identifier according to indication information, or determine the minimum of the first identifier and the second identifier as the PUCCH resource identifier according to indication information. The indication information includes at least one of: radio resource control (RRC) information, media access control (MAC) information, and DCI.

Building on the first aspect, in a possible implementation, determining the PUCCH resource identifier at least according to the higher-layer configuration information and the DCI includes the following. Determine the time-domain start position for receiving the first DCI, at least according to the configuration information for the first transmission resource, and determine the time-domain start position for receiving the second DCI, at least according to the configuration information for the second transmission resource; determine the PUCCH resource identifier at least according to the time-domain start position for receiving the first DCI and the time-domain start position for receiving the second DCI according to a predefined method.

Building on the first aspect, in a possible implementation, determining the PUCCH resource identifier at least according to the time-domain start position for receiving the first DCI and the time-domain start position for receiving the second DCI according to the predefined method includes the following.

If the time-domain start position for receiving the first DCI is before the time-domain start position for receiving the second DCI, determine the PUCCH resource identifier at least according to the first transmission resource and the first DCI. Or, if the time-domain start position for receiving the first DCI is before the time-domain start position for receiving the second DCI, determine the PUCCH resource identifier at least according to the second transmission resource and the second DCI. Or, determine to obtain the PUCCH resource identifier at least according to the first transmission resource and the first DCI, according to the indication information. Or, determine to obtain the PUCCH resource identifier at least according to the second transmission resource and the second DCI, according to the indication information. The indication information includes at least one of: RRC information, MAC information, DCI.

Building on the first aspect, in a possible implementation, determining the PUCCH resource identifier at least according to the higher-layer configuration information and the DCI includes the following. Determine an index of a first PDCCH and a starting-CCE index of the first PDCCH at least according to configuration information for the first transmission resource and the first DCI, and determine an index of a second PDCCH and a starting-CCE index of the second PDCCH at least according to configuration information for the second transmission resource and the second DCI. Determine the PUCCH resource identifier at least according to the starting-CCE index of the first PDCCH or the starting-CCE index of the second PDCCH according to a predefined method. Or, determine the PUCCH resource identifier at least according to a starting-CCE index of a PDCCH corresponding to the maximum of the index of the first PDCCH and the index of the second PDCCH. Or, determine the PUCCH resource identifier at least according to a starting-CCE index of a PDCCH corresponding to the minimum of the index of the first PDCCH and the index of the second PDCCH.

Building on the first aspect, in a possible implementation, determining the PUCCH resource identifier at least according to the starting-CCE index of the first PDCCH or the starting-CCE index of the second PDCCH according to a predefined method includes the following. According to indication information, determine to obtain the PUCCH resource identifier at least according to a starting-CCE index of a PDCCH corresponding to the maximum of an index of the first PDCCH resource and an index of the second PDCCH. Or, according to indication information, determine to obtain the PUCCH resource identifier at least according to a starting-CCE index of a PDCCH corresponding to the minimum of an index of the first PDCCH resource and an index of the second PDCCH. The indication information includes at least one of: RRC information, MAC information, DCI.

Building on the first aspect, in a possible implementation, determining the PUCCH resource identifier at least according to the higher-layer configuration information and the DCI includes the following. Determine a starting-CCE index for receiving the first PDCCH at least according to configuration information for the first transmission resource and the first DCI, and determine a starting-CCE index for receiving the second PDCCH at least according to configuration information for the second transmission resource and the second DCI. Determine the PUCCH resource identifier at least according to the starting-CCE index of the first PDCCH or the starting-CCE index of the second PDCCH according to a predefined method. Or, determine the PUCCH resource identifier at least according to the maximum of the starting-CCE index for receiving the first PDCCH and the starting-CCE index for receiving the second PDCCH. Or, determine the PUCCH resource identifier at least according to the minimum of the starting-CCE index for receiving the first PDCCH and the starting-CCE index for receiving the second PDCCH.

Building on the first aspect, in a possible implementation, determining the PUCCH resource identifier at least according to the higher-layer configuration information and the DCI includes the following. Determine, at least according to indication information, to obtain the PUCCH resource identifier according to the maximum of the starting-CCE index of the first PDCCH and the starting-CCE index of the second PDCCH. Or, determine, at least according to indication information, to obtain the PUCCH resource identifier according to the minimum of the starting-CCE index of the first PDCCH and the starting-CCE index of the second PDCCH. The indication information includes at least one of: RRC information, MAC information, DCI.

Building on the first aspect, in a possible implementation, determining the PUCCH resource identifier at least according to the higher-layer configuration information and the DCI includes the following. Determine the identifier of the first TCI state and the identifier of the second TCI state according to the higher-layer configuration information. The position of the first TCI state in the control resource set is before the position of the second TCI state, the first TCI state is used for the first transmission point to transmit the PDCCH, and the second TCI state is used for the second transmission point to transmit the PDCCH. Determine, in a predefined manner, to determine the PUCCH resource identifier at least according to the transmission resource corresponding to the first TCI state or the second TCI state and the DCI. Or, determine, in a predefined manner, to determine the PUCCH resource identifier at least according to the transmission resource corresponding to a maximum TCI state identifier or the minimum TCI state identifier of the first TCI state identifier and the second TCI state identifier and the DCI.

Building on the first aspect, in a possible implementation, determining, in a predefined manner, to determine the PUCCH resource identifier according to the transmission resource corresponding to the first TCI state or the second TCI state and the DCI includes the following. Determine, according to indication information, to determine the PUCCH resource identifier at least according to the transmission resource corresponding to the first TCI state or the second TCI state and the DCI.

Determining, according to a predefined manner, to determine the PUCCH resource identifier according to the transmission resource corresponding to a maximum TCI state identifier or the minimum TCI state identifier of the first TCI state identifier and the second TCI state identifier and the DCI includes the following. Determine, according to indication information, to determine the PUCCH resource identifier according to the transmission resource corresponding to a maximum TCI state identifier or the minimum TCI state identifier of the first TCI state identifier and the second TCI state identifier and the DCI. The indication information includes at least one of: RRC information, MAC information, DCI.

Building on the first aspect, in a possible implementation, if the higher-layer configuration information contains an index of a first search space set and an index of a second search space set, with the first search space set corresponds to the first transmission point and the second search space set corresponds to the second transmission point, another possible method for determining the PUCCH resource identifier at least according to the higher-layer configuration information and the DCI includes the following. Determine the PUCCH resource identifier at least according to resources corresponding to the first search space set or the second search space set according to a predefined method. Or, determine the PUCCH resource identifier at least according to resources corresponding to a search space set with a smallest or largest index in the first search space set and the second search space set.

Building on the first aspect, in a possible implementation, determining the PUCCH resource identifier at least according to resources corresponding to the first search space set or the second search space set according to a predefined method may include the following. Determine, according to indication information, to determine the PUCCH resource identifier at least according to transmission resources corresponding to the first search space set or the second search space set and DCI. Or, determine, according to indication information, to determine the PUCCH resource identifier at least according to resources corresponding to a search space set with a smallest or largest index in the first search space set index and the second search space set index. The indication information includes at least one of: RRC information, MAC information, DCI.

Building on the first aspect, in a possible implementation, if the higher-layer configuration information contains an index of a first control resource set/an index of a first control resource set pool and an index of a second control resource set/an index of a first control resource set pool, where the first control resource set corresponds to the first transmission point and the second control resource set corresponds to the second transmission point, a possible method for determining the PUCCH resource identifier at least according to the higher-layer configuration information and the DCI includes the following. Determine the PUCCH resource identifier at least according to resources associated with the control resource set corresponding to the minimum or maximum of the index of the first control resource set and the index of the second control resource set, according to a predefined method. Or, determine the PUCCH resource identifier at least according to resources associated with the control resource set corresponding to the minimum or maximum of the index of the first control resource set pool and the index of the second control resource set pool, according to a predefined method.

Building on the first aspect, in a possible implementation, determining, according to a predefined method, the PUCCH resource identifier at least according to resources associated with the control resource set corresponding to the minimum or maximum of the index of the first control resource set and the index of the second control resource set includes the following. Determine, according to indication information, to determine the PUCCH resource identifier at least according to resources associated with the control resource set corresponding to the minimum or maximum of the index of the first control resource set and the index of the second control resource set.

Determining the PUCCH resource identifier according to resources associated with the control resource set corresponding to the minimum or maximum of the index of the first control resource set pool and the index of the second control resource set pool according to a predefined method includes the following. Determine, according to indication information, to determine the PUCCH resource identifier at least according to resources associated with the control resource set corresponding to the minimum or maximum of the index of the first control resource set pool and the index of the second control resource set pool. The indication information includes at least one of: RRC information, MAC information, DCI.

Building on the first aspect, in a possible implementation, if the higher-layer configuration information contains a first control resource set and a second control resource set, and the first control resource set corresponds to the first transmission point and the second control resource set corresponds to the second transmission point, determining the PUCCH resource identifier at least according to the higher-layer configuration information and the DCI includes the following. Determine a first CCE number according to the first control resource set, and determine a second CCE number according to the second control resource set. Determine a first CCE number according to the first control resource set, and determine a second CCE number according to the second control resource set. Or, determine the PUCCH resource identifier at least according to the minimum of the first CCE number and the second CCE number. Or, determine the PUCCH resource identifier at least according to the maximum of the first CCE number and the second CCE number.

Building on the first aspect, in a possible implementation, determining the PUCCH resource identifier at least according to the minimum or maximum of the first CCE number and the second CCE number according to a predefined method includes the following. Determine, according to indication information, to determine the PUCCH resource identifier at least according to the minimum or maximum of the first CCE number and the second CCE number. The indication information includes at least one of: RRC information, MAC information, DCI.

Building on the first aspect, in a possible implementation, the method further includes the following. Receive resource identifier indication information, and determine the PUCCH resource identifier according to the resource identifier indication information.

In a second aspect, disclosed herein are embodiments of a method for resource identifier determination. The method includes the following. Obtain higher-layer configuration information and DCI, where the DCI includes control information sent by a first transmission point over a first transmission resource and control information sent by a second transmission point over a second transmission resource. Send the higher-layer configuration information and the DCI.

Building on the second aspect, in a possible implementation, the method further includes the following. A PUCCH resource identifier is determined at least according to the higher-layer configuration information and the DCI.

Building on the second aspect, in a possible implementation, the higher-layer configuration information includes configuration information for a control resource set and configuration information for a search space set, the DCI includes a first DCI sent by a first transmission point and a second DCI sent by a second transmission point.

Building on the second aspect, in a possible implementation, determining the PUCCH resource identifier at least according to the higher-layer configuration information and the DCI includes the following. Determine a first identifier at least according to configuration information for the first transmission resource and the first DCI, determine a second identifier at least according to configuration information for the second transmission resource and the second DCI. Determine the first identifier or the second identifier as the PUCCH resource identifier according to a predefined method. Or, determine the maximum of the first identifier and the second identifier as the PUCCH resource identifier. Or, determine the minimum of the first identifier and the second identifier as the PUCCH resource identifier.

Building on the second aspect, in a possible implementation, determining the first identifier or the second identifier as the PUCCH resource identifier according to a predefined method includes the following. Determine the maximum of the first identifier and the second identifier as the PUCCH resource identifier according to indication information, or determine the minimum of the first identifier and the second identifier as the PUCCH resource identifier according to indication information. The indication information includes at least one of: RRC information, MAC information, and DCI.

Building on the second aspect, in a possible implementation, determining the PUCCH resource identifier at least according to the higher-layer configuration information and the DCI includes the following. Determine the time-domain start position for receiving the first DCI, at least according to the configuration information for the first transmission resource, and determine the time-domain start position for receiving the second DCI, at least according to the configuration information for the second transmission resource; determine the PUCCH resource identifier at least according to the time-domain start position for receiving the first DCI and the time-domain start position for receiving the second DCI according to a predefined method.

Building on the second aspect, in a possible implementation, determining the PUCCH resource identifier at least according to the time-domain start position for receiving the first DCI and the time-domain start position for receiving the second DCI according to the predefined method includes the following.

If the time-domain start position for receiving the first DCI is before the time-domain start position for receiving the second DCI, determine the PUCCH resource identifier at least according to the first transmission resource and the first DCI. Or, if the time-domain start position for receiving the first DCI is before the time-domain start position for receiving the second DCI, determine the PUCCH resource identifier at least according to the second transmission resource and the second DCI. Or, determine to obtain the PUCCH resource identifier at least according to the first transmission resource and the first DCI, according to the indication information. Or, determine to obtain the PUCCH resource identifier at least according to the second transmission resource and the second DCI, according to the indication information. The indication information includes at least one of: RRC information, MAC information, DCI.

Building on the second aspect, in a possible implementation, determining the PUCCH resource identifier at least according to the higher-layer configuration information and the DCI includes the following. Determine an index of a first PDCCH and a starting-CCE index of the first PDCCH at least according to configuration information for the first transmission resource and the first DCI, and determine an index of a second PDCCH and a starting-CCE index of the second PDCCH at least according to configuration information for the second transmission resource and the second DCI. Determine the PUCCH resource identifier at least according to a starting-CCE index of a PDCCH corresponding to the index of the first PDCCH or the index of the second PDCCH according to a predefined method. Or, determine the PUCCH resource identifier at least according to a PDCCH resource corresponding to the maximum of the starting-CCE index of the first PDCCH and the starting-CCE index of the second PDCCH. Or, determine the PUCCH resource identifier at least according to a starting-CCE index of a PDCCH corresponding to the minimum of the starting-CCE index of the first PDCCH and the starting-CCE index of the second PDCCH.

Building on the second aspect, in a possible implementation, determining the PUCCH resource identifier at least according to the starting-CCE index of the first PDCCH or the starting-CCE index of the second PDCCH according to a predefined method includes the following. According to indication information, determine to obtain the PUCCH resource identifier at least according to a starting-CCE index of a PDCCH corresponding to the maximum of an index of the first PDCCH resource and an index of the second PDCCH. Or, according to indication information, determine to obtain the PUCCH resource identifier at least according to a starting-CCE index of a PDCCH corresponding to the minimum of an index of the first PDCCH resource and an index of the second PDCCH. The indication information includes at least one of: RRC information, MAC information, DCI.

Building on the second aspect, in a possible implementation, determining the PUCCH resource identifier at least according to the higher-layer configuration information and the DCI includes the following. Determine a starting-CCE index for receiving the first PDCCH at least according to configuration information for the first transmission resource and the first DCI, and determine a starting-CCE index for receiving the second PDCCH at least according to configuration information for the second transmission resource and the second DCI. Determine the PUCCH resource identifier at least according to the starting-CCE index of the first PDCCH or the starting-CCE index of the second PDCCH according to a predefined method. Or, determine the PUCCH resource identifier at least according to the maximum of the starting-CCE index for receiving the first PDCCH and the starting-CCE index for receiving the second PDCCH. Or, determine the PUCCH resource identifier at least according to the minimum of the starting-CCE index for receiving the first PDCCH and the starting-CCE index for receiving the second PDCCH.

Building on the second aspect, in a possible implementation, determining the PUCCH resource identifier at least according to the higher-layer configuration information and the DCI includes the following. Determine, at least according to indication information, to obtain the PUCCH resource identifier according to the maximum of the starting-CCE index of the first PDCCH and the starting-CCE index of the second PDCCH. Or, determine, at least according to indication information, to obtain the PUCCH resource identifier according to the minimum of the starting-CCE index of the first PDCCH and the starting-CCE index of the second PDCCH. The indication information includes at least one of: RRC information, MAC information, DCI.

Building on the second aspect, in a possible implementation, determining the PUCCH resource identifier at least according to the higher-layer configuration information and the DCI includes the following. Determine the identifier of the first TCI state and the identifier of the second TCI state according to the higher-layer configuration information. The position of the first TCI state in the control resource set is before the position of the second TCI state, and the first TCI state is used for the first transmission point to transmit the PDCCH, and the second TCI state is used for the second transmission point to transmit the PDCCH. Determine, in a predefined manner, to determine the PUCCH resource identifier at least according to the transmission resource corresponding to the first TCI state or the second TCI state and the DCI. Or, determine, in a predefined manner, to determine the PUCCH resource identifier at least according to the transmission resource corresponding to a maximum TCI state identifier or the minimum TCI state identifier of the first TCI state identifier and the second TCI state identifier and the DCI.

Building on the second aspect, in a possible implementation, determining, in a predefined manner, to determine the PUCCH resource identifier according to the transmission resource corresponding to the first TCI state or the second TCI state and the DCI includes the following. Determine, according to indication information, to determine the PUCCH resource identifier at least according to the transmission resource corresponding to the first TCI state or the second TCI state and the DCI.

Determining, according to a predefined manner, to determine the PUCCH resource identifier according to the transmission resource corresponding to the maximum TCI state identifier or the minimum TCI state identifier of the first TCI state identifier and the second TCI state identifier and the DCI includes the following. Determine, according to indication information, to determine the PUCCH resource identifier according to the transmission resource corresponding to the maximum TCI state identifier or the minimum TCI state identifier of the first TCI state identifier and the second TCI state identifier and the DCI. The indication information includes at least one of: RRC information, MAC information, DCI.

Building on the second aspect, in a possible implementation, if the higher-layer configuration information contains an index of a first search space set and an index of a second search space set, with the first search space set corresponds to the first transmission point and the second search space set corresponds to the second transmission point, another possible method for determining the PUCCH resource identifier at least according to the higher-layer configuration information and the DCI includes the following. Determine the PUCCH resource identifier at least according to resources corresponding to the first search space set or the second search space set according to a predefined method. Or, determine the PUCCH resource identifier at least according to resources corresponding to a search space set with a smallest or largest index in the first search space set and the second search space set.

Building on the second aspect, in a possible implementation, determining the PUCCH resource identifier at least according to resources corresponding to the first search space set or the second search space set according to a predefined method may include the following. Determine, according to indication information, to determine the PUCCH resource identifier at least according to transmission resources corresponding to the first search space set or the second search space set and DCI. Or, determine, according to indication information, to determine the PUCCH resource identifier at least according to resources corresponding to a search space set with a smallest or largest index in the first search space set index and the second search space set index. The indication information includes at least one of: RRC information, MAC information, DCI.

Building on the second aspect, in a possible implementation, if the higher-layer configuration information contains an index of a first control resource set/an index of a first control resource set pool and an index of a second control resource set/an index of a first control resource set pool, where the first control resource set corresponds to the first transmission point and the second control resource set corresponds to the second transmission point, a possible method for determining the PUCCH resource identifier at least according to the higher-layer configuration information and the DCI includes the following. Determine the PUCCH resource identifier according to resources associated with the control resource set corresponding to the minimum or maximum of the index of the first control resource set and the index of the second control resource set, according to a predefined method. Or, determine the PUCCH resource identifier according to resources associated with the control resource set corresponding to the minimum or maximum of the index of the first control resource set pool and the index of the second control resource set pool, according to a predefined method.

Building on the second aspect, in a possible implementation, according to a predefined method, determining the PUCCH resource identifier at least according to resources associated with the control resource set corresponding to the minimum or maximum of the index of the first control resource set and the index of the second control resource set includes the following. Determine, according to indication information, to determine the PUCCH resource identifier at least according to resources associated with the control resource set corresponding to the minimum or maximum of the index of the first control resource set and the index of the second control resource set.

Determining the PUCCH resource identifier according to resources associated with the control resource set corresponding to the minimum or maximum of the index of the first control resource set pool and the index of the second control resource set pool according to a predefined method includes the following. Determine, according to indication information, to determine the PUCCH resource identifier at least according to resources associated with the control resource set corresponding to the minimum or maximum of the index of the first control resource set pool and the index of the second control resource set pool. The indication information includes at least one of: RRC information, MAC information, DCI.

Building on the second aspect, in a possible implementation, if the higher-layer configuration information contains a first control resource set and a second control resource set, and the first control resource set corresponds to the first transmission point and the second control resource set corresponds to the second transmission point, a possible method for determining the PUCCH resource identifier at least according to the higher-layer configuration information and the DCI includes the following. Determine a first CCE number according to the first control resource set, and determine a second CCE number according to the second control resource set. Determine a first CCE number according to the first control resource set, and determine a second CCE number according to the second control resource set. Or, determine the PUCCH resource identifier at least according to the minimum of the first CCE number and the second CCE number. Or, determine the PUCCH resource identifier at least according to the maximum of the first CCE number and the second CCE number.

Building on the second aspect, in a possible implementation, determining the PUCCH resource identifier at least according to the minimum or maximum of the first CCE number and the second CCE number according to a predefined method includes the following. Determine, according to indication information, to determine the PUCCH resource identifier at least according to the minimum or maximum of the first CCE number and the second CCE number.

Building on the second aspect, in a possible implementation, the method further includes the following. Send resource identifier indication information, where the resource identifier indication information is indicative of the PUCCH resource identifier.

In a third aspect, disclosed herein are embodiments of a terminal device. The device includes: a first receiving unit configured to receive higher-layer configuration information; a first determining unit configured to determine a first transmission resource of a first transmission point and a second transmission resource of a second transmission point at least according to the higher-layer configuration information; a second receiving unit configured to receive DCI according to the first transmission resource and the second transmission resource; and a second determining unit configured to determine a PUCCH resource identifier at least according to the higher-layer configuration information and the DCI.

In a fourth aspect, disclosed herein are embodiments of a network device. The device includes: an obtaining unit configured to obtain higher-layer configuration information and DCI, where the DCI comprises control information sent by a first transmission point over a first transmission resource and control information sent by a second transmission point over a second transmission resource; a sending unit configured to send the higher-layer configuration information and the DCI.

In a fifth aspect, disclosed herein are embodiments of a computer-readable storage medium, where the computer-readable storage medium stores a computer program for electronic data exchange, and the computer program causes a computer to perform some or all of the steps described in the first or second aspect of the embodiments.

In a fifth aspect, disclosed herein are embodiments of a computer program product, which includes a non-transitory computer-readable storage medium storing a computer program, where the computer program is operable to cause a computer to perform some or all of the steps described in the first or second aspect of the embodiments. The computer program product can be a software installation package.

Persons of ordinary skill in the art should understand that all or part of the steps of the methods according to the embodiments of the present disclosure may be implemented by a program instructing relevant hardware. The program may be stored in a computer readable memory. The memory may include a flash memory disk, a read-only memory, a random access memory, a magnetic disk, or an optical disk, and so on.

The embodiments of the present disclosure are introduced in detail above, specific examples are used in the present disclosure to set forth the principle and embodiments of the present disclosure, and the description of the above embodiments is only used to help understand the method of the present disclosure and the core idea thereof. Meanwhile, a person of ordinary skill in the art may make modifications to the specific implementations and disclosure scopes according to the idea of the present disclosure. In conclusion, the content of the description shall not be construed as a limitation to the present disclosure.

What is claimed is:

1. A method for resource identifier determination, comprising:

receiving higher-layer configuration information and downlink control information (DCI); and determining a physical uplink control channel (PUCCH) resource identifier according to the higher-layer configuration information and the DCI;

wherein in response to the higher-layer configuration information comprising an index of a first search space set and an index of a second search space set, determining the PUCCH resource identifier according to the higher-layer configuration information and the DCI comprises:

determining the PUCCH resource identifier at least according to resources associated with a control resource set corresponding to a search space set with a smallest or largest index in the first search space set and the second search space set-.

2. The method of claim 1, wherein the higher-layer configuration information comprises configuration information for a control resource set and configuration information for a search space set, the DCI comprises a first DCI sent by a first transmission point and a second DCI sent by a second transmission point.

3. The method of claim 2, wherein the first search space set corresponds to the first transmission point and the second search space set corresponds to the second transmission point.

4. A terminal device, comprising:

a transceiver;

a processor; and a memory storing program codes which, when executed by the processor, are operable with the processor to:

cause the transceiver to receive higher-layer configuration information;

and downlink control information (DCI); and determine a physical uplink control channel (PUCCH) resource identifier according to the higher-layer configuration information and the DCI;

wherein in terms of determining the PUCCH resource identifier according to the higher-layer configuration information and the DCI, the program codes, when executed by the processor, are operable with the processor to:

in response to the higher-layer configuration information comprising an index of a first search space set and an index of a second search space set, determine the PUCCH resource identifier at least according to resources associated with a control resource set corresponding to a search space set with a smallest or largest index in the first search space set and the second search space set.

5. The terminal device of claim 4, wherein the higher-layer configuration information comprises configuration information for a control resource set and configuration information for a search space set, the DCI comprises a first DCI sent by a first transmission point and a second DCI sent by a second transmission point.

6. The terminal device of claim 5, wherein the first search space set corresponds to the first transmission point and the second search space set corresponds to the second transmission point.

7. A non-transitory computer-readable storage medium, storing computer programs comprising program instructions, wherein the program instructions, when executed by a computer, cause the computer to perform the following:

receiving higher-layer configuration information;

and downlink control information (DCI); and determining a physical uplink control channel (PUCCH) resource identifier according to the higher-layer configuration information and the DCI;

wherein in terms of determining the PUCCH resource identifier according to the higher-layer configuration information and the DCI, the program codes, the program instructions, when executed by a computer, cause the computer to perform the following:

in response to the higher-layer configuration information comprising an index of a first search space set and an index of a second search space set, determine the PUCCH resource identifier at least according to resources associated with a control resource set corresponding to a search space set with a smallest or largest index in the first search space set and the second search space set.

8. The non-transitory computer-readable storage medium of claim 7, wherein the higher-layer configuration information comprises configuration information for a control resource set and configuration information for a search space set, the DCI comprises a first DCI sent by a first transmission point and a second DCI sent by a second transmission point.

9. The non-transitory computer-readable storage medium of claim 8, wherein the first search space set corresponds to the first transmission point and the second search space set corresponds to the second transmission point.

* * * * *